Patented Feb. 11, 1936

2,030,385

UNITED STATES PATENT OFFICE 2,030,385

EMULSIONS

George James Manson, Hawkesbury, Ontario, Canada, assignor, by mesne assignments, to Manson Chemical Company, Montclair, N. J., a corporation No Drawing. Application July 8, 1926, Serial No. 121,261. Renewed October 27, 1933

11 Claims. (Cl. 134—22)

This invention relates to improvements in emulsions, and the objects of the invention are to form a relatively stable emulsion which may be used for the purpose of disseminating wax or the like in mixtures or materials in which it is to be used, as for example, in the sizing of paper.

In emulsions of the character to which this invention refers, it is desirable that emulsions when formed should be freely dilutable with water and to this end that the individual particles of wax should be thinly coated with the emulsified medium so that their bulk will not be unduly increased, and the particles remain in discrete form without any tendency to tackiness. I have found that it is possible to form a thin but sufficient coating about the particles of wax by forming a gel in the emulsified mixture rather than by adding a pre-formed emulsified agent thereto.

Such a gel may be formed by a variety of compounds as for example by combining a water soluble acid salt with a silicate, the re-action of which is preferably caused to take place while being mixed with the molten wax while the whole mass is agitated and/or in rapid motion.

Of water soluble acid salts which may be used, I may mention magnesium chloride, magnesium sulphite, aluminum sulphate, calcium chloride or other members of the same group. Sodium silicate may be conveniently used as the silicate to form the gel or gelatinous coating material. The method is applicable to wax which may be animal, mineral or vegetable wax as well as to the emulsification of these ingredients with themselves or with wax.

In practicing the method, the wax or other water repellant material is melted and mixed with water containing in solution water soluble acid salt of the character above described. The silicate is then added and the mixture stirred, the temperature being above the melting point of wax or water repellant substance whereby the gel formed in the mixture will form a coating about the particles of wax or other water repellant substance to maintain the wax or water repellant substance in discrete form when the mixture cools.

The following may be taken as a practical example of a method of making the emulsion:—

100 pounds of Montan wax (a water repellant substance) is melted and 27 pounds of magnesium sulphate (a water soluble substance) is added in 80 pounds of water; this solution is heated to about 10° above the melting point of Montan wax; the melted Montan wax and the solution of magnesium sulphate is then rapidly stirred and 15 pounds silicate of soda (a water soluble material) dissolved in 15 pounds of water is added. A gel is immediately formed about the particles of Montan wax, keeping them from coalescing together when the mixture cools. It will be seen that by this means the wax is maintained in a finely divided state and in a condition which enables it to be readily disseminated through any material with which it is to be used.

The mixture or emulsion may be used to waterproof paper or textile materials. In waterproofing paper, the mixture may be added to the beater with or without waterproofing agents, and may be coagulated on the fibres in the usual manner by adding alum to the beater until the proper pH value of about 4.5 is established. Or, alternatively, the paper may be coated with the emulsion with or without the addition of other materials before or after the paper is dried.

Textiles may be waterproofed by passing the web of cloth through a bath of the emulsion with or without the addition of other materials, and then drying it.

As many changes could be made in the above process, and many apparently widely different embodiments of my invention, within the scope of the claims, constructed without departing from the spirit or scope thereof, it is intended that all matter contained in the accompanying specification shall be interpreted as illustrative and not in a limiting sense.

What I claim as my invention is:

1. The herein described method of treating wax which comprises melting the wax, adding the same to a solution of a water soluble salt, then adding to the solution a second water soluble salt adapted with the first water soluble salt to form a gel.

2. The herein described method of treating wax which comprises adding wax to a solution of magnesium salt, then heating and agitating the solution and adding a silicate adapted to precipitate a magnesium compound from said magnesium salt.

3. The herein described method of preparing wax for use in wax sizes which comprises melting wax and emulsifying it in water in the presence of a gel precipitated in the presence of the wax.

4. The herein described method of preparing wax for use in wax sizes which comprises melting wax and emulsifying it in water in the presence of a silicate gel precipitated in the presence of the wax.

5. The herein described method of preparing wax for use in wax sizes which comprises melting wax and emulsifying it in water in the presence of a magnesium silicate gel precipitated in the presence of the wax.

6. The herein described method of treating a thermoplastic waterproofing agent which comprises melting the waterproofing agent, adding the same to a solution of a water soluble compound, then adding to the solution a second water soluble compound adapted to form a gel with the first-named water-soluble compound.

7. The herein described method of preparing thermoplastic waterproofing agent for use in sizes of the same which comprises melting the waterproofing agent and emulsifying it in water in the presence of a gel precipitated in the presence of the waterproofing agent.

8. An emulsion containing wax particles carrying a silicate gel coating precipitated in situ on said wax particles.

9. An emulsion containing wax particles carrying a magnesium silicate gel coating precipitated in situ on said wax particles.

10. An emulsion containing wax particles carrying a thin coating precipitated by double decomposition in situ on said wax particles, said coating being sufficient to maintain the particles in discrete form without substantial tendency to tackiness.

11. An emulsion containing particles of thermoplastic waterproofing agent carrying a thin coating precipitated by double decomposition in situ on said particles of waterproofing agent, said coating being sufficient to maintain the particles in discrete form without substantial tendency to tackiness.

GEORGE JAMES MANSON.